US012554165B2

United States Patent
Li et al.

(10) Patent No.: US 12,554,165 B2
(45) Date of Patent: Feb. 17, 2026

(54) DISPLAY PANEL AND DISPLAY DEVICE

(71) Applicant: Wuhan China Star Optoelectronics Technology Co., Ltd., Wuhan (CN)

(72) Inventors: Yue Li, Wuhan (CN); Bo Liu, Wuhan (CN); Qiang Gong, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/605,023

(22) PCT Filed: Sep. 10, 2021

(86) PCT No.: PCT/CN2021/117549
§ 371 (c)(1),
(2) Date: Oct. 20, 2021

(87) PCT Pub. No.: WO2023/029070
PCT Pub. Date: Mar. 9, 2023

(65) Prior Publication Data
US 2024/0019617 A1 Jan. 18, 2024

(30) Foreign Application Priority Data
Aug. 30, 2021 (CN) .......................... 202111004298.X

(51) Int. Cl.
G02F 1/1339 (2006.01)
G02F 1/1335 (2006.01)
G02B 5/20 (2006.01)

(52) U.S. Cl.
CPC .... *G02F 1/13396* (2021.01); *G02F 1/133514* (2013.01); *G02F 1/13394* (2013.01); *G02B 5/201* (2013.01)

(58) Field of Classification Search
None
See application file for complete search history.

(56) References Cited

U.S. PATENT DOCUMENTS 6,348,958 B1 2/2002 Matsuoka et al.
2006/0158599 A1* 7/2006 Koo ................... G02F 1/13394
349/155

(Continued)

FOREIGN PATENT DOCUMENTS

CN 102147548 A 8/2011
CN 107664860 A 2/2018

(Continued)

*Primary Examiner* — Dung T Nguyen
(74) *Attorney, Agent, or Firm* — Nathan & Associates Patent Agents Ltd.; Menachem Nathan

(57) ABSTRACT

A display panel and a display device are provided. The display panel includes: a first substrate and a second substrate disposed opposite the first substrate; a light-obstructing layer, which is disposed on one side of the first substrate close to the second substrate and includes a first light-obstructing layer disposed in a sealant area; a color resistance layer including a first color resistance layer disposed in the sealant area and on one side of the first light-obstructing layer close to the second substrate; and a first support pillar disposed in the sealant area and between the first color resistance layer and the second substrate.

17 Claims, 4 Drawing Sheets

(56) References Cited

U.S. PATENT DOCUMENTS

| | | | |
|---|---|---|---|
| 2012/0081640 | A1 | 4/2012 | Kim et al. |
| 2015/0131025 | A1 | 5/2015 | Ota |
| 2016/0041413 | A1 | 2/2016 | Nishino et al. |
| 2018/0088405 | A1* | 3/2018 | Nagasawa ......... G02F 1/133512 |

FOREIGN PATENT DOCUMENTS

| | | |
|---|---|---|
| CN | 108196389 A | 6/2018 |
| CN | 111258124 A | 6/2020 |
| CN | 111474772 A | 7/2020 |
| CN | 112596308 A | 4/2021 |
| JP | H07311378 A | 11/1995 |
| JP | 3032197 B1 | 4/2000 |
| KR | 20120034978 A | 4/2012 |
| KR | 20180012915 A | 2/2018 |

\* cited by examiner

1

DISPLAY PANEL AND DISPLAY DEVICE

FIELD OF INVENTION

The present application relates to a technical field of a display, and more particularly to a display panel and a display device.

BACKGROUND OF INVENTION

At present, a liquid crystal display (LCD) device has a display area and a sealant area disposed around the display area. When a box thickness of a part of the LCD device corresponding to the display area is greater than a box thickness of a part of the LCD device corresponding to the sealant area, a yellowing phenomenon appears in a peripheral region of the LCD device in a displaying process.

Thus, it is necessary to propose a technical solution to solve the problem of the yellowing phenomenon, which appears in the peripheral region when the LCD device is displaying and is caused by the reason that the box thickness of the part corresponding to the display area is greater than the box thickness of the part of the LCD device corresponding to the sealant area.

SUMMARY OF INVENTION

Technical Problem

An objective of the present application is to provide a display panel and a display device for enhancing the box thickness uniformity of the display panel, and improving the yellowing phenomenon caused by the non-uniform box thickness.

Technical Solutions

A display panel has a display area and a sealant area disposed around the display area. The display panel includes: a first substrate and a second substrate disposed opposite the first substrate; a light-obstructing layer, which is disposed on one side of the first substrate close to the second substrate, and includes a first light-obstructing layer disposed in the sealant area; a color resistance layer including a first color resistance layer disposed in the sealant area and on one side of the first light-obstructing layer close to the second substrate; and first support pillars disposed in the sealant area and between the first color resistance layer and the second substrate.

A display device includes the above-mentioned display panel.

Useful Effect

In the present application, disposing the first color resistance layer on the first light-obstructing layer of the sealant area, and disposing the first support pillars between the first color resistance layer and the second substrate can increase the box thickness of the display panel corresponding to the sealant area, improve the problem, which indicates that the box thickness of the sealant area is smaller than the box thickness of the display area and is caused by the box thickness of the sealant area being decreased in the cutting process of forming the display panel, and guarantee that the display area and the sealant area of the display panel have the uniform box thickness, thereby improving the yellowing phenomenon of the peripheral display caused by the non-uniform box thickness. In addition, the color resistance layer and the first support pillars are concurrently disposed on the first light-obstructing layer of the sealant area in the present application, thereby guaranteeing the box thickness uniformity and increasing the support performance of the sealant area of the display panel.

DETAILED DESCRIPTION OF EMBODIMENTS

The technical solutions in the embodiments of the present application will be clearly and completely described below in conjunction with the drawings in the embodiments of the present application. Obviously, the embodiments described are only a part of the embodiments of the present application, rather than all the embodiments. Based on the embodiments in the present application, all other embodiments obtained by those skilled in the art without creative works should be deemed as falling within the claims of the present application.

Figure 1:
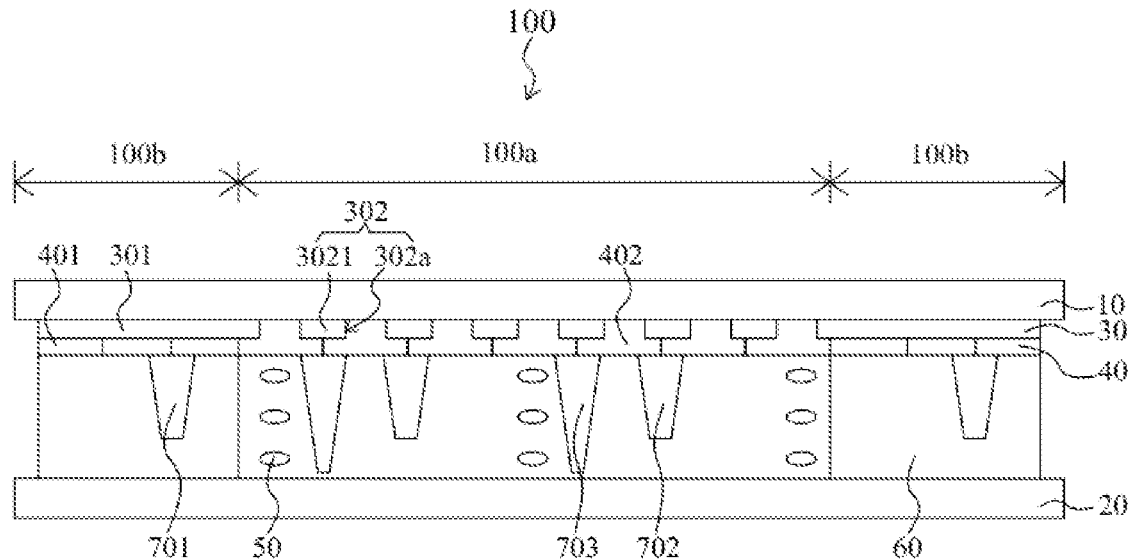
FIG. 1 is a schematic cross-section view showing a display panel provided by a first embodiment of the present application.
Figure 2:
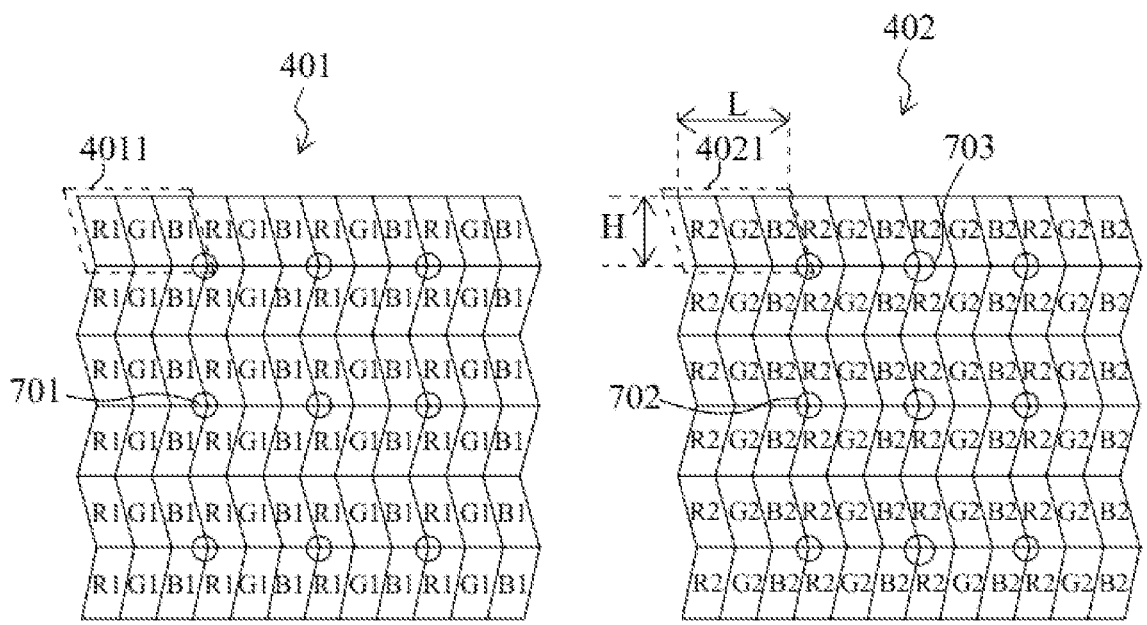
FIG. 2 is a schematic partial plane view showing a first color resistance layer and a second color resistance layer of the display panel of FIG. 1.

FIG. 1 is a schematic cross-section view showing a display panel 100 provided by a first embodiment of the present application. FIG. 2 is a schematic partial plane view showing a first color resistance layer and a second color resistance layer of the display panel of FIG. 1. Referring to FIGS. 1 and 2, the display panel 100 is a LCD panel and has a display area 100a and a sealant area 100b disposed around the display area 100a. The display panel 100 includes a first substrate 10, a second substrate 20, a light-obstructing layer 30, a color resistance layer 40, a liquid crystal 50, a sealant 60, first support pillars 701, second support pillars 702 and third support pillars 703. The first substrate 10 is disposed opposite the second substrate 20. The sealant 60 is disposed in the sealant area 100b and connects the first substrate 10 to the second substrate 20. The liquid crystal 50 is disposed in a space surrounded by the first substrate 10, the second substrate 20 and the sealant 60.

In this embodiment, each of the first substrate 10 and the second substrate 20 is a glass substrate.

In this embodiment, the light-obstructing layer 30 is disposed on one side of the first substrate 10 close to the second substrate 20. Specifically, the light-obstructing layer 30 is disposed on the first substrate 10 and includes a first light-obstructing layer 301 and a second light-obstructing layer 302, which are configured as pertaining to the same layer. The first light-obstructing layer 301 is connected to the second light-obstructing layer 302, is disposed in the sealant area 100b and is an integrally frame-shaped light-obstructing layer. The second light-obstructing layer 302 is disposed in the display area 100a and includes a grid-like light-obstructing pattern 3021 and openings 302a. The first light-obstructing layer 301 having a rectangular frame shape is disposed in the sealant area 100b in a full-surface contacting manner. The material of forming the light-obstructing layer 30 is a black organic material. The light-obstructing layer 30 has a thickness ranging from 1.5 microns to 2.5 microns. For example, the thickness of the light-obstructing layer 30 is equal to 2.0 microns.

In this embodiment, the color resistance layer 40 includes a first color resistance layer 401 and a second color resistance layer 402, which are configured as pertaining to the same layer, wherein the first color resistance layer 401 is disposed in the sealant area 100b and disposed on one side of the first light-obstructing layer 301 close to the second substrate 20, and the second color resistance layer 402 is disposed in the display area 100a, in the openings 302a of the second light-obstructing layer 302 and on one side of the grid-like light-obstructing pattern 3021 close to the second substrate 20. The color resistance layer 40 has a thickness ranging from 1.5 microns to 2.5 microns. Compared with the prior art, the present application increases the box thickness the sealant area 100b of the sealant area 100b while guaranteeing the support effect against the box thickness of the sealant area 100b by adding the first color resistance layer 401 to the sealant area 100b and configuring the first color resistance layer 401 to support the first support pillars 701. The second color resistance layer 402 is a single-layer color resistor and plays the role of light filtering. The first color resistance layer 401 is also a single-layer color resistor, and this is beneficial to making the thickness of the first color resistance layer 401 tend to be the same as the thickness of the second color resistance layer 402, so that the box thickness of the display area 100a tends to be the same as the box thickness of the sealant area 100b.

It is to be described that the inventor has discovered, based on a lot of experiments and creative labors, that the thickness of the first color resistance layer 401 relates to the surface area of the first color resistance layer 401 (e.g., the surface area of the first color resistance layer 401 away from the first light-obstructing layer 301, or the surface area of the first color resistance layer 401 close to the first light-obstructing layer 301). Adjusting the surface area of the first color resistance layer 401 can adjust the thickness of the first color resistance layer 401, and thus adjust the box thickness of the sealant area 100b commonly supported by the first light-obstructing layer 301, the first color resistance layer 401, the first support pillars 701 and the sealant 60.

In this embodiment, a percentage ratio of a contact surface area between the first light-obstructing layer 301 and the first color resistance layer 401 to a surface area of a surface of the first light-obstructing layer 301 close to the first color resistance layer 401 is equal to 100%. That is, the first color resistance layer 401 also presents a frame-like and integral surface structure. Referring to FIG. 2, the first color resistance layer 401 includes multiple first repeat units 4011 contacting in row directions and column directions, and the second color resistance layer 402 includes multiple second repeat units 4021 contacting in row directions and column directions, wherein the multiple first repeat units 4011 and the multiple second repeat units 4021 are arranged in rows and columns and thus in an array. Each of the first repeat unit 4011 and the second repeat unit 4021 includes at least two color resistance units having different colors. For example, the first repeat unit 4011 includes a first red color resistor R1, a first green color resistor G1 and a first blue color resistor B1 sequentially arranged, wherein adjacent two of the first red color resistor R1, the first green color resistor G1 and the first blue color resistor B1 contact each other, and an arbitrary one of the first red color resistor R1, the first green color resistor G1 and the first blue color resistor B1 is repeated in the column direction to form a continuous configuration. Each second repeat unit 4021 includes a second red color resistor R2, a second green color resistor G2 and a second blue color resistor B2 sequentially arranged, wherein adjacent two of the second red color resistor R2, the second green color resistor G2 and the second blue color resistor B2 contact each other, and an arbitrary one of the second red color resistor R2, the second green color resistor G2 and the second blue color resistor B2 is repeated in the column direction to form the continuous configuration. The first red color resistor R1 is the same as the second red color resistor R2. The first green color resistor G1 is the same as the second green color resistor G2. The first blue color resistor B1 is the same as the second blue color resistor B2. Thus, the first repeat unit 4011 is the same as the second repeat unit 4021, and a surface area of a surface of the first repeat unit 4011 away from the first light-obstructing layer is the same as a surface area of a surface of the second repeat unit 4021 away from the second light-obstructing layer. It is understandable that the first color resistance layer 401 as a whole may be a color resistance layer having one single color. The length L and the height H of the second repeat unit 4021 range from 50 microns to 100 microns. For example, the length L and the height H of the second repeat unit 4021 are equal to 90 microns.

In this embodiment, the first support pillars 701 are disposed in the sealant area 100b, disposed on one side of the first color resistance layer 401 close to the second substrate 20, and disposed in the sealant 60. The second support pillars 702 are disposed in the display area 100a and on one side of the second color resistance layer 402 close to the second substrate 20. The second support pillars 702 are disposed in correspondence with the grid-like light-obstructing pattern 3021. The third support pillars 703 are disposed in the display area 100a and on one side of the second color resistance layer 402 close to the second substrate 20. The third support pillars 703 are disposed in correspondence with the grid-like light-obstructing pattern 3021. The height of the third support pillar 703 is greater than the height of the second support pillar 702. The distribution density of the second support pillars 702 is greater than the distribution density of the third support pillars 703. The third support pillars 703 play a role of main support pillars. The second support pillars 702 play a role of auxiliary support pillars. The height of the first support pillar 701 is equal to the height of the second support pillar 702. The distribution density of the first support pillars 701 is greater than the distribution density of the second support pillars 702. The box thickness of the sealant area 100b, which is maintained by the collocation of the first support pillars 701, the first color resistance layer 401, the first light-obstructing layer 301 and the sealant 60, tends to be the same as the box thickness of the display area 100a, which is maintained by the collocation of the second support pillars 702, the third support pillars 703, the second color resistance layer 402 and the second light-obstructing layer 302. Specifically, the heights of the first support pillars 701 and the heights of the second support pillars 702 range from 0.2 microns to 0.4 microns, and the heights of the third support pillars 703 range from 0.3 microns to 0.6 microns.

In this embodiment, the first support pillar 701 is disposed on sides of multiple adjacent ones of the first repeat units 4011 close to the second substrate 20, so that the first support pillars 701 can provide the better supports for the multiple adjacent ones of the first repeat units 4011. Specifically, the first support pillar 701 is disposed on four adjacent first repeat units 4011.

In this embodiment, the first support pillar 701 is disposed on at least adjacent two of the color resistance units having different colors. Specifically, each first support pillar 701 is disposed on two adjacent first red color resistors R1 and two adjacent first blue color resistors B1. Compared with the first support pillars 701 being disposed on the green color resistor, which tends to peel and thus provides the poor support effect on the support pillars, the first support pillars 701 in this embodiment are disposed on the red color resistor and the blue color resistor, which is beneficial to the enhancement of the support stability of the first color resistance layer 401 on the first support pillars 701. The second support pillar 702 may be disposed on multiple adjacent second repeat units 4021, and the third support pillars 703 may be randomly distributed as long as the distribution density of the first support pillars 701 on each first repeat unit 4011 in the sealant area 100b can be guaranteed to be equal to or approach a sum of the distribution density of the second support pillars 702 and the distribution density of the third support pillars 703 on each second repeat unit 4021 in the display area 100a. The distribution density represents the percentage of the area of the support pillars contacting the color resistance layer to the distribution area of the support pillars.

In this embodiment, thin film transistors, a common electrode, pixel electrodes and the like are disposed on the second substrate 20, wherein detailed description thereof will be omitted.

In the display panel of this embodiment, the sealant area is added to the entire surface of the first color resistance layer, and the first support pillars having the heights the same as the heights of the second support pillars in the display area are disposed on the first color resistance layer, thereby improving the problem of the non-uniform box thickness, which is present when the box thickness of the sealant area is smaller than the box thickness of the display area, and caused by the decrease of the box thickness of the sealant area in the cutting process of forming the display panel, so that the box thickness of the display panel corresponding to the sealant area and the box thickness of the display panel corresponding to the display area tends to be the same, and the peripheral yellowing problem upon displaying of the display panel is improved.

Figure 3:
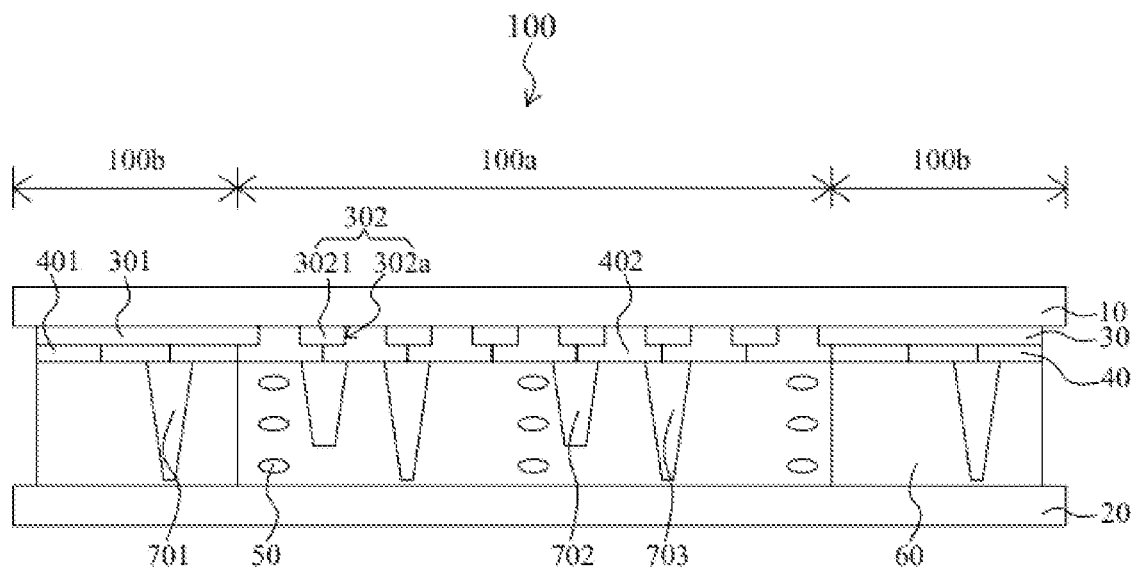
FIG. 3 is a schematic cross-section view showing a display panel provided by a second embodiment of the present application.

FIG. 3 is a schematic cross-section view showing a display panel provided by a second embodiment of the present application. Referring to FIG. 3, the display panel of the second embodiment is basically similar to the display panel of the first embodiment except for the difference that, in the sealant area 100b, a percentage ratio of a contact surface area between the first light-obstructing layer 301 and the first color resistance layer 401 to a surface area of a surface of the first light-obstructing layer 301 close to the first color resistance layer 401 is greater than or equal to 10% and smaller than 100%, and the height of the first support pillar 701 is equal to the height of the third support pillar 703. For example, the percentage ratio of the contact surface area between the first light-obstructing layer 301 and the first color resistance layer 401 to the surface area of the surface of the first light-obstructing layer 301 close to the first color resistance layer 401 may be 20%, 30%, 40%, 45%, 50%, 60%, 70%, 80% and 90%. The greater percentage ratio of the contact surface area between the first light-obstructing layer 301 and the first color resistance layer 401 to the surface area of the surface of the first light-obstructing layer 301 close to the first color resistance layer 401 represents the greater thickness of the first color resistance layer 401.

In this embodiment, the first color resistance layer 401 includes multiple separately disposed color resistance islands 401a, wherein the first support pillars 701 are disposed on one side of the color resistance islands 401a close to the second substrate 20, a hollow part 401b for exposing the first light-obstructing layer 301 is disposed between arbitrary adjacent two of the color resistance islands 401a, a gap is present between the color resistance islands 401a to level and thus adjust the thicknesses of the color resistance islands 401a, and the gaps between arbitrary adjacent two of the color resistance islands 401a are the same. Designing the separately disposed color resistance islands 401a can adjust the thickness of the first color resistance layer 401 within a suitable range. Specifically, the color resistance island 401a includes multiple rows of first repeat units 4011, and each row of the first repeat units 4011 include multiple first repeat units 4011 disposed in parallel, and adjacent two first repeat units 4011 in each color resistance island 401a contact each other in the row direction and the column direction. It is understandable that each row of first repeat units 4011 may also include multiple first repeat units 4011 separately disposed in the row direction and the column direction. Alternatively, the color resistance islands 401a may also be multiple columns of first repeat units 4011.

In this embodiment, the color resistance islands 401a are disposed on the first light-obstructing layer 301, and the first support pillars 701 are disposed on the color resistance islands 401a, so that the collocated design of the first light-obstructing layer 301, the first color resistance layer 401, the first support pillar 701 and the sealant in the sealant area 100b and the collocated design of the second light-obstructing layer 302, the second color resistance layer 402, the second support pillars 702 and the third support pillars 703 in the display area 100a can guarantee that the box thicknesses of the display area 100a and the sealant area 100b of the display panel have the uniformity.

In this embodiment, the distribution density of the third support pillars 703 is smaller than or equal to the distribution density of the first support pillars 701. Specifically, the distribution density of the first support pillars 701 ranges from 0.02% to 3%, and may be, for example, 0.08%, 0.1%, 0.5%, 1%, 1.5%, 2%, 2.5% and 3%. Further, the distribution density of the first support pillars 701 and the distribution density of the third support pillars 703 range from 0.8% to 1.5%. For example, the distribution density of the first support pillars 701 is 0.25%, and the distribution density of the third support pillars 703 is 0.22%.

In this embodiment, the percentage ratio of the surface area of the surface of the first repeat unit 4011 away from the first light-obstructing layer 301 to the surface area of the surface of the second repeat unit 4021 away from the second light-obstructing layer 302 is greater than or equal to 10% and smaller than 100%, so that the thickness of the color resistance island 401a falls within the suitable range. As the percentage ratio of the surface area of the first repeat unit 4011 to the surface area of the second repeat unit 4021 gets smaller, the area of the hollow part 401b between the adjacent color resistance islands 401a gets larger, and the thickness of the color resistance island 401a gets smaller.

Further, the percentage ratio of the surface area of the surface of the first repeat unit 4011 away from the first light-obstructing layer 301 to the surface area of the surface of the second repeat unit 4021 away from the second light-obstructing layer 302 is greater than or equal to 30% and smaller than or equal to 90%. For example, the percentage ratio of the surface area of the surface of the first repeat unit 4011 away from the first light-obstructing layer 301 to the surface area of the surface of the second repeat unit 4021 away from the second light-obstructing layer 302 is 20%, 30%, 40%, 50%, 60%, 70%, 80% and 90%.

Figure 4:
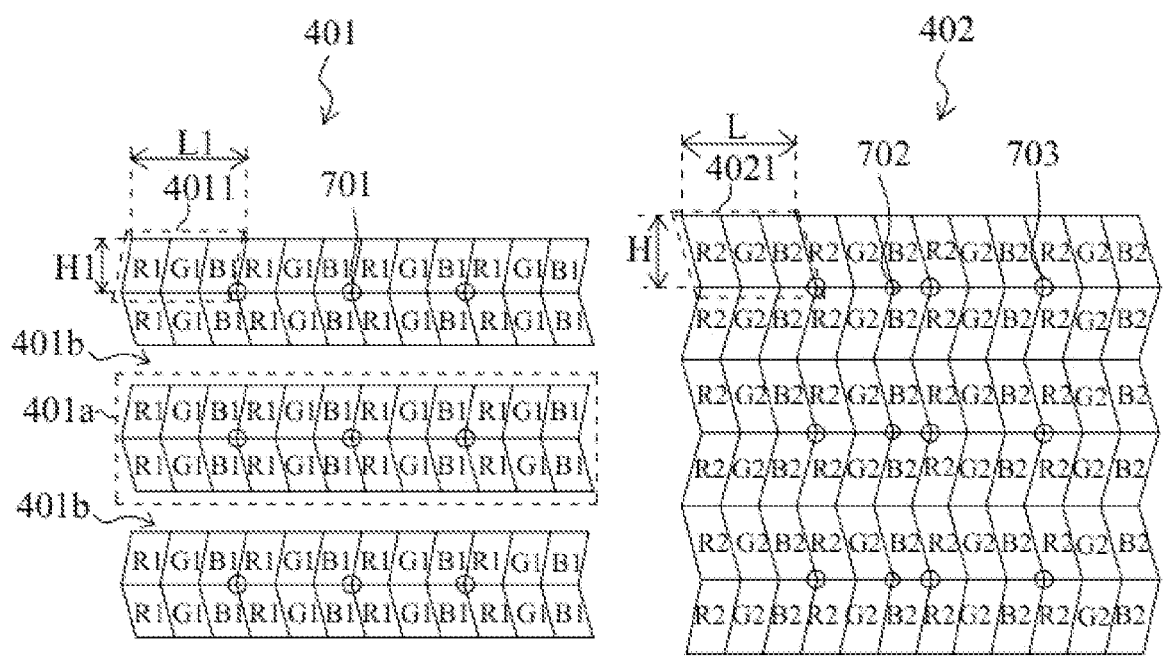
FIG. 4 is a first schematic partial plane view showing the first color resistance layer and the second color resistance layer of the display panel shown in FIG. 3.

Referring to FIG. 4, the first repeat unit 4011 has a length L1, the first repeat unit 4011 has a height H1, the second repeat unit 4021 has a length L, the second repeat unit 4021 has a height H, the length L1 of the first repeat unit 4011 is equal to the length L of the second repeat unit, and the percentage ratio of the height H1 of the first repeat unit 4011 to the height H of the second repeat unit 4021 is greater than or equal to 10% and smaller than 100%. Thus, the height H1 of the first repeat unit 4011 is configured to be different from the height H of the second repeat unit 4021 to control the percentage ratio of the surface area of the surface of the first repeat unit 4011 away from the first light-obstructing layer 301 to the surface area of the surface of the second repeat unit 4021 away from the second light-obstructing layer 302. Specifically, each of the length of first red color resistor R1, the length of the first green color resistor G1 and the length of the first blue color resistor B1 is equal to one third of the length L1 of the first repeat unit 4011; each of the height of the first red color resistor R1, the height of the first green color resistor G1 and the height of the first blue color resistor B1 is equal to the height H1 of the first repeat unit 4011; each of the length of the second red color resistor R2, the length of the second green color resistor G2 and the length of the second blue color resistor B2 is equal to one third of the length L of the second repeat unit 4021; and each of the height of the second red color resistor R2, the height of the second green color resistor G2 and the height of the second blue color resistor B2 is equal to the height H of the second repeat unit 4021.

As listed in Table 1, which includes the first gap of the sealant area and the second gap of the display area corresponding to the conventional (prior art) display panel and the first gap of the sealant area and the second gap of the display area corresponding to different percentage ratios of the surface area of the surface of the first repeat unit away from the first light-obstructing layer to the surface area of the surface of the second repeat unit away from the second light-obstructing layer of this embodiment, wherein the first gap is the distance from the highest point of the first support pillars to the first substrate, the second gap is the distance from the highest point of the third support pillars to the first substrate. In the prior art, the auxiliary support pillars (first support pillars) are disposed on the light-obstructing layer in the sealant area, and the auxiliary support pillars and the main support pillars (third support pillars) are disposed on the color filter layer in the display area.

TABLE 1

|  | Prior art | 10% | 30% | 50% | 70% | 90% |
|---|---|---|---|---|---|---|
| First gap (microns) | 6.5 | 6.8 | 7.0 | 7.2 | 7.6 | 7.7 |

TABLE 1-continued

|  | Prior art | 10% | 30% | 50% | 70% | 90% |
|---|---|---|---|---|---|---|
| Second gap (microns) | 7.1 | 7.1 | 7.3 | 7.4 | 7.5 | 7.5 |

Compared with the prior art according to Table 1, it is obtained that when the percentage ratio of the surface area of the surface of the first repeat unit away from the first light-obstructing layer to the surface area of the surface of the second repeat unit away from the second light-obstructing layer in this embodiment ranges from 10% to 90%, the difference between the first gap and the second gap can be decreased, so that the box thickness of the display panel corresponding to the sealant area and the box thickness of the display panel corresponding to the display area tend to be the same.

Compared with the display panel of the first embodiment, the display panel of this embodiment adopts the configuration of the color resistance island, so that the thickness of the color resistance island is smaller than the thickness of the entire surface of the first color resistance layer of the first embodiment. Adjusting the surface area of the color resistance island and thus adjusting the thickness of the color resistance island can adjust the box thickness of the display panel corresponding to the sealant area more flexibly, wherein the design of the color resistance island collocates with the first support pillar with the height the same as that of the third support pillar is beneficial to the guarantee that the box thickness of the sealant area is the same as the box thickness of the display area.

Figure 5:
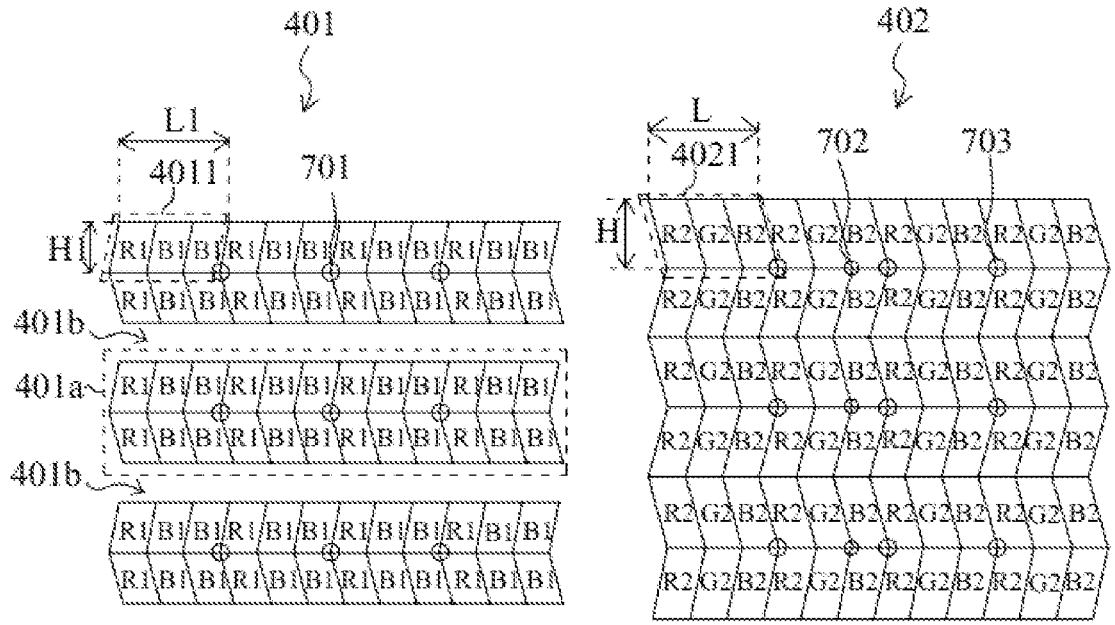
FIG. 5 is a second schematic partial plane view showing the first color resistance layer and the second color resistance layer of the display panel shown in FIG. 3.
Figure 6:
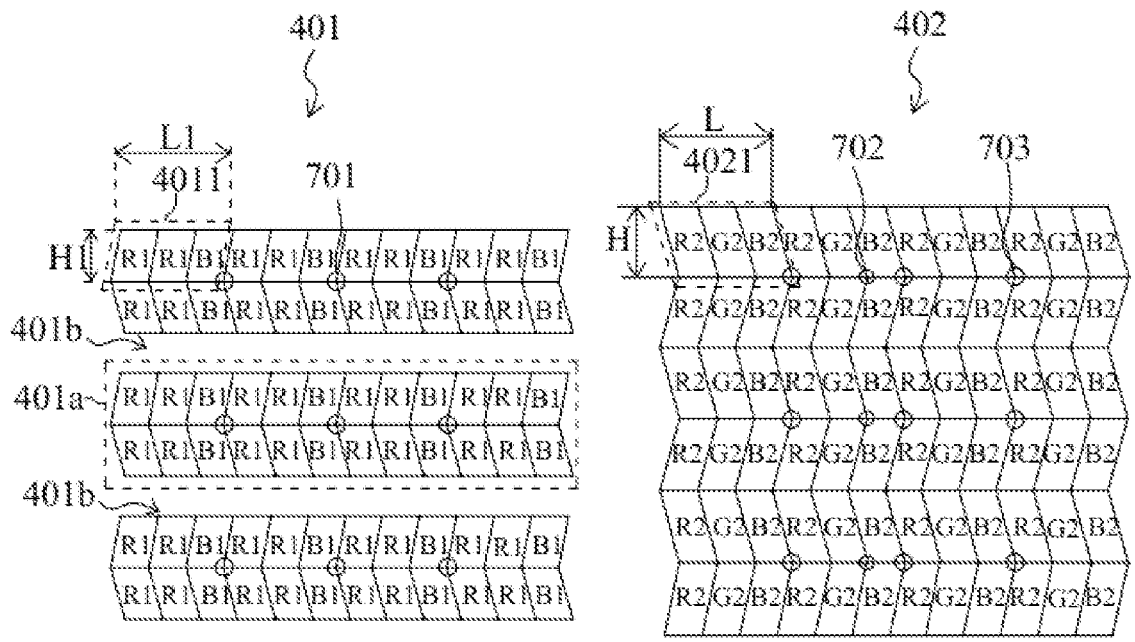
FIG. 6 is a third schematic partial plane view showing the first color resistance layer and the second color resistance layer of the display panel shown in FIG. 3.

Referring to FIGS. 5 and 6, the display panels of FIGS. 5 and 6 are basically similar to the display panel of FIG. 4 except for the differences that the first repeat unit 4011 of FIG. 5 includes two first blue color resistors B1 which may be the same as or different from each other; and that the first repeat unit 4011 of FIG. 6 includes two first red color resistors R1, which may be the same as or different from each other.

Figure 7:
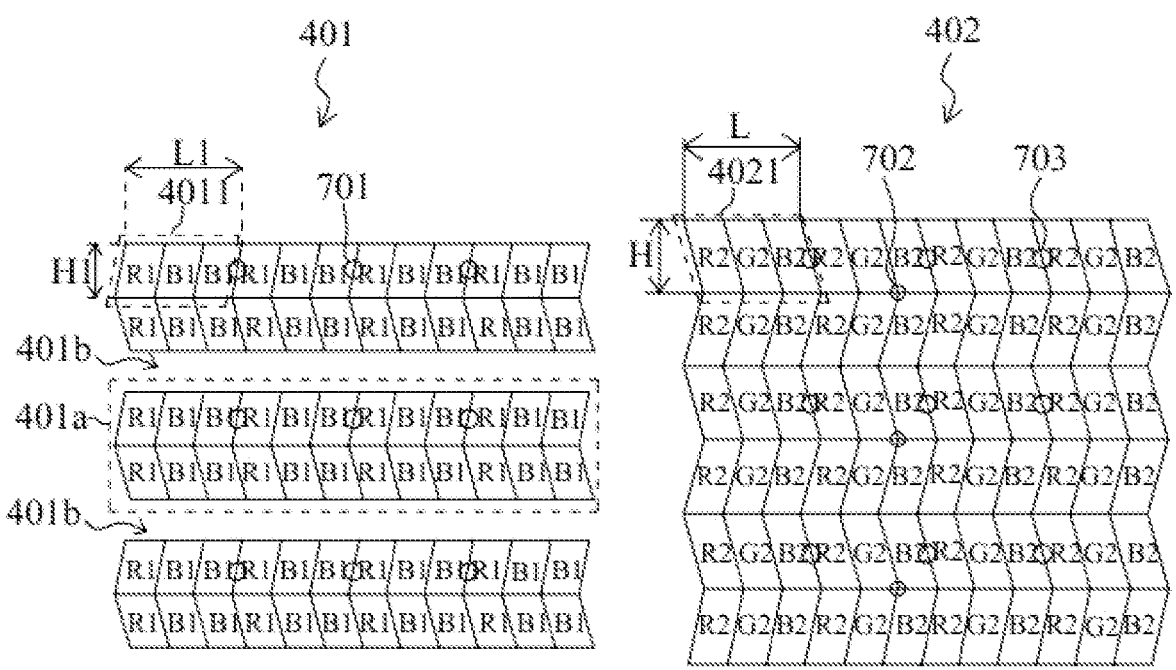
FIG. 7 is a fourth schematic partial plane view showing the first color resistance layer and the second color resistance layer of the display panel shown in FIG. 3.

Referring to FIG. 7, the display panel of FIG. 7 is basically similar to the display panel of FIG. 5 except for the difference that the first support pillar 701 is disposed on the first red color resistor R1 and the first blue color resistor B1 of two adjacent first repeat units 4011, wherein the first red color resistor R1 is disposed adjacent to the first blue color resistor B1.

The present application further provides a display device, which includes an arbitrary one of the display panels and a backlight module, wherein the display panel is disposed on a light-emitting side of the backlight module.

The descriptions of the above-mentioned embodiments are only used to help understand the technical solutions and core ideas of the present application. Those of ordinary skill in the art should understand that they can still modify the technical solutions described in the foregoing embodiments, or equivalently replace some of the technical features; and these modifications or replacements do not cause the essence of the corresponding technical solutions to deviate from the scope of the technical solutions of the embodiments of the present application.

What is claimed is:

1. A display panel having a display area and a sealant area disposed around the display area, the display panel comprising:
   a first substrate and a second substrate disposed opposite the first substrate;

a light-obstructing layer, which is disposed on one side of the first substrate close to the second substrate, and comprises a first light-obstructing layer disposed in the sealant area;

a color resistance layer comprising a first color resistance layer disposed in the sealant area and on one side of the first light-obstructing layer close to the second substrate, the color resistance layer further comprises a second color resistance layer disposed in the display area, and the second color resistance layer and the first color resistance layer pertain to a same layer;

first support pillars disposed in the sealant area and between the first color resistance layer and the second substrate;

second support pillars disposed in the display area, and disposed on one side of the second color resistance layer close to the second substrate; and third support pillars disposed in the display area, and disposed on the one side of the second color resistance layer close to the second substrate;

wherein a distribution density of the third support pillars is less than or equal to a distribution density of the first support pillars.

2. The display panel according to claim 1, wherein the first light-obstructing layer is an integrally frame-shaped light-obstructing layer, and a percentage ratio of a contact surface area between the first light-obstructing layer and the first color resistance layer to a surface area of a surface of the first light-obstructing layer close to the first color resistance layer is greater than or equal to 10% and smaller than or equal to 100%.

3. The display panel according to claim 2, wherein:

the percentage ratio of the contact surface area between the first light-obstructing layer and the first color resistance layer to the surface area of the surface of the first light-obstructing layer close to the first color resistance layer is equal to 100%;

the light-obstructing layer further comprises a second light-obstructing layer in the display area, the second light-obstructing layer and the first light-obstructing layer pertain to a same layer, and the second light-obstructing layer comprises a grid-like light-obstructing pattern and an opening;

the second color resistance layer is disposed in the opening, and the grid-like light-obstructing pattern is close to one side of the second substrate;

the second support pillars and the third support pillars are disposed in correspondence with the grid-like light-obstructing pattern; and heights of the third support pillars are greater than heights of the second support pillars, and heights of the first support pillars are equal to the heights of the second support pillars.

4. The display panel according to claim 1, wherein the first color resistance layer comprises multiple color resistance islands separately disposed, and the first support pillars are disposed on one side of the color resistance islands close to the second substrate.

5. The display panel according to claim 1, wherein the light-obstructing layer further comprises a second light-obstructing layer in the display area, the second light-obstructing layer and the first light-obstructing layer pertain to a same layer, and the second light-obstructing layer comprises a grid-like light-obstructing pattern and an opening.

6. The display panel according to claim 5, wherein the second color resistance layer is disposed in the opening, and the grid-like light-obstructing pattern is close to one side of the second substrate.

7. The display panel according to claim 6, wherein the second support pillars and the third support pillars are disposed in correspondence with the grid-like light-obstructing pattern;

wherein heights of the third support pillars are greater than heights of the second support pillars, and the heights of the third support pillars are equal to heights of the first support pillars.

8. The display panel according to claim 4, wherein the color resistance islands comprise multiple first repeat units, and the second color resistance layer comprises multiple second repeat units, wherein each of the first repeat units and the second repeat units comprises at least two color resistance units having different colors, a percentage ratio of a surface area of a surface of the first repeat unit away from the first light-obstructing layer to a surface area of a surface of the second repeat unit away from the second light-obstructing layer is greater than or equal to 10% and smaller than 100%.

9. The display panel according to claim 8, wherein the percentage ratio of the surface area of the surface of the first repeat unit away from the first light-obstructing layer to the surface area of the surface of the second repeat unit away from the second light-obstructing layer is greater than or equal to 30% and smaller than or equal to 90%.

10. The display panel according to claim 8, wherein each of the first support pillars is disposed on sides of multiple adjacent ones of the first repeat units close to the second substrate; and/or, wherein the first support pillars are disposed on sides of at least adjacent two of the color resistance units having different colors close to the second substrate.

11. The display panel according to claim 8, wherein each of the color resistance islands comprises multiple rows of the first repeat units, and each of the rows of the first repeat units comprises multiple ones of the first repeat units.

12. The display panel according to claim 1, wherein the distribution density of the first support pillars ranges from 0.02% to 3%.

13. The display panel according to claim 1, wherein the display panel further comprises:

a sealant, which is disposed in the sealant area, and connects the first substrate to the second substrate, wherein the first support pillars are disposed in the sealant.

14. A display device, comprising a display panel, the display panel having a display area and a sealant area disposed around the display area, the display panel comprising:

a first substrate and a second substrate disposed opposite the first substrate;

a light-obstructing layer, which is disposed on one side of the first substrate close to the second substrate, and comprises a first light-obstructing layer disposed in the sealant area;

a color resistance layer comprising a first color resistance layer disposed in the sealant area and on one side of the first light-obstructing layer close to the second substrate, the color resistance layer further comprises a second color resistance layer disposed in the display area, and the second color resistance layer and the first color resistance layer pertain to a same layer; and first support pillars disposed in the sealant area and between the first color resistance layer and the second substrate;

second support pillars disposed in the display area, and disposed on one side of the second color resistance layer close to the second substrate; and third support pillars disposed in the display area, and disposed on the one side of the second color resistance layer close to the second substrate;

wherein a distribution density of the third support pillars is less than or equal to a distribution density of the first support pillars.

15. The display device according to claim 14, wherein the first light-obstructing layer is an integrally frame-shaped light-obstructing layer, and a percentage ratio of a contact surface area between the first light-obstructing layer and the first color resistance layer to a surface area of a surface of the first light-obstructing layer close to the first color resistance layer is greater than or equal to 10% and smaller than or equal to 100%.

16. The display device according to claim 14, wherein the first color resistance layer comprises multiple color resistance islands separately disposed, and the first support pillars are disposed on one side of the color resistance islands close to the second substrate.

17. The display device according to claim 16, wherein:

the light-obstructing layer further comprises a second light-obstructing layer in the display area, the second light-obstructing layer and the first light-obstructing layer pertain to a same layer, and the second light-obstructing layer comprises a grid-like light-obstructing pattern and an opening;

the second color resistance layer is disposed in the opening, and the grid-like light-obstructing pattern is close to one side of the second substrate;

the second support pillars and the third support pillars are disposed in correspondence with the grid-like light-obstructing pattern; and heights of the third support pillars are greater than heights of the second support pillars, and the heights of the third support pillars are equal to heights of the first support pillars.

* * * * *